3,573,029
SEPARATION OF AMMONIUM PHOSPHATE FROM NITROPHOSPHATE PRODUCT MIXTURES
William T. Curless, Overland Park, Kans., assignor to Gulf Research & Development Company, Pittsburgh, Pa.
No Drawing. Filed Apr. 25, 1968, Ser. No. 725,587
Int. Cl. C05b 7/00
U.S. Cl. 71—34      4 Claims

ABSTRACT OF THE DISCLOSURE

By controlling a number of variables within specific limits, solid mixed ammonium phosphate fertilizer substantially free of solid ammonium nitrate and having a $NH_3:H_3PO_4$ mole ratio varying from 1.1 to 2.0 is crystallized from ammoniated nitrophosphate product. Optionally, a second solid rich in ammonium nitrate may be isolated from the liquid phase of the ammonium phosphate removal stage. The liquid from this second stage may be recycled or utilized for other purposes.

DESCRIPTION OF INVENTION

The most widely used method of rendering phosphorus values in phosphate rock available for fertilizer use is by reaction of the rock with sulfuric acid. The phosphoric acid thus produced is commonly called wet process phosphoric acid and may be further reacted to yield finished fertilizer. The most common finished fertilizer prepared from wet process phosphoric acid is ammonium phosphate in the form of monoammonium phosphate, diammonium phosphate or a mixture of the two.

Although the manufacture of wet process phosphoric acid is widespread and has heretofore been economical, increasing demand for phosphate fertilizer and a limited supply of inexpensive (Frasch Process) sulfur makes the future for new wet process phosphoric acid plants questionable. Various processes have been proposed for the acidulation of phosphate rock with acids other than sulfuric. The most promising of these processes employ nitric acid and are generally referred to as nitric phosphate, nitrophosphate or nitrophos processes.

Several nitrophosphate process modifications exist and indeed commercial nitrophosphate plants have been operated successfully for a number of years. This is particularly true in areas where sulfur prices are high, such as Western Europe.

Nitrophosphate processes also have problems. Since the initial reaction mixture consists of what may be considered for simplicity a mixture of phosphoric acid and calcium nitrate, it is necessary to remove from the mixture the calcium which is present.

One method used is that of cooling the solution to near 0° C., precipitating part of the calcium nitrate. The solid calcium nitrate is then separated and either sold as a fertilizer or reacted with ammonium carbonate to form ammonium nitrate. This is called the Odda process and although used commercially, requires costly investment, many complicated steps and high power requirements because of the refrigeration which is necessary in the cooling step.

A second modification suggested by Loginova (Zhur. Khim. Prom. 15, 28–38 (1938)) and others utilizes ammonium sulfate to precipitate calcium sulfate and then removes the ammonium sulfate for re-use by reacting the calcium sulfate with ammonium carbonate. This process has been called the sulfate cycle nitrophosphate process. Effluent from the extraction of phosphate rock with nitric acid is treated with ammonium sulfate, precipitating calcium sulfate. The calcium sulfate is filtered from the process, leaving a liquid containing predominantly phosphoric acid and ammonium nitrate. This liquid is neutralized with ammonia and evaporated to yield a finished fertilizer of about 28–14–0 composition. The calcium sulfate is treated with ammonia and carbon dioxide (ammonium carbonate) to regenerate the ammonium sulfate for re-use.

Although more economical than the Odda process, one obvious disadvantage of the sulfate cycle nitrophosphate process is lack of flexibility as to $N:P_2O_5$ ratio in the product. Hignett states that "unless some way of separating the diammonium phosphate from the ammonium nitrate is devised, the product will contain both in a fixed ratio of $N:P_2O_5$ of about 2 to 1 (28–14–0)" (Hignett, Travis P., "Nitrophosphate Processes—Advantages and Disadvantages" Proceedings of the 15th Annual Meeting, Fertilizer Industry Round Table, Washington, D.C., November 10–12, 1965, pages 94–95.)

Processes have been previously reported for the separation of ammonium phosphate from ammonium phosphate-ammonium nitrate mixtures (see, for example, Loginova, ibid; Strelzoff et al., Pat. 2,689,175). These processes have been limited to the separation of ammonium phosphate having a $NH_3$ to $H_3PO_4$ mole ratio of 1.0; that is, to the separation of monoammonium phosphate. Considerable effort has been expended in studying the system which includes ammonium phosphate-ammonium nitrate mixtures (see Bergman and Bochkarev, Izv. Akad. Nauk SSSR, Ser. Khim, 1938, No. 1, 237; Flatt et al., Helv. Chim, Acta 38, 753 (1955), 38, 769 (1955), 39, 483 (1956), 45, 485 (1962); Kusnetsov et al., Zhur Pricklad Khim, 21, 1278 (1948); Margolis and Glazova, Issled. Khim Technol. Udobr. Pestits. solei, Akad. Nauk SSSR Otd. Biokhim, Biofiz. Khim. Fiziol. 1965, 82–85; Bergman and Velikanova, Zh. Neorgen, Khim. 11, No. 10, 2370–3 (1966). No process has been heretofore disclosed, however for the separation of ammonium phosphate from mixtures with ammonium nitrate to obtain ammonium phosphate products having $NH_3:H_3PO_4$ mole ratios in the range of my invention; that is, ratios of 1.1 to 2.0.

My invention consists of a method for the separation of substantially nitrate-free, solid ammonium phosphate products having $NH_3$ to $H_3PO_4$ mole ratios varying from 1.1 to 2.0 from aqueous ammonium nitrate-ammonium phosphate mixtures. Specifically, the separation may be made using as starting material effluents such as are obtained from a sulfate cycle nitrophosphate process. Actually, any mixture of ammonium nitrate and ammonium phosphate having the proper $NH_3$ to $H_3PO_4$ mole ratio may be so separated, as can mixtures which may be adjusted to such mole ratios by ammoniation. This includes ammonium nitrate-phosphoric acid mixtures and nitric acid-phosporic acid mixtures.

In another modification of my invention a method is disclosed for the removal of a second solid from the filtrate derived from the ammonium phosphate removal step. This solid consists of ammonium nitrate which contains from about 3–10% ammonium phosphate. The liquid phase from this second solid removal step may be utilized as a product such as a liquid fertilizer or it may be concentrated by evaporation and prilled or it may be recycled.

The advantages of the various modifications of this invention are discussed later where specific illustrations of the process are given.

Briefly, my process consists of performing the following steps in combination:

(A) Feeding to a reactor and reacting together a mixture of solid and aqueous liquid phases of a composition consisting essentially of ammonium nitrate, ammonium phosphate and water, while maintaining a temperature ranging from normal room temperature to the boiling point at atmospheric pressure.

(B) Controlling the proportions of water and nitrate ion in the liquid phase in the reactor within the following concentration limits:

(1) Water content of the liquid phase between 5 weight percent at the highest operating temperature and 35 weight percent at the lowest operating temperature, (2) Nitrate ion to water weight ratio in the liquid phase between 7.0 at the highest operating temperature and 1.3 at the lowest operating temperature.

(C) Controlling the proportions of ammonium and phosphate ions in the liquid phase within the reactor so that in addition to the ammonium nitrate present there are also sufficient additional ammonium ions to maintain the concentration of ammonium phosphate within one of the following three sets of limitations:

(1) from less than 6 weight percent monoammonium phosphate at the highest operating temperature to less than 2.5 weight percent at the lowest operating temperature in combination with from 2 to 5 weight percent diammonium phosphate, (2) from 2 to 5 weight percent diammonium phosphate, or (3) less than 2.0 weight percent triammonium phosphate in combination with from 0.2 to 1.0 weight percent diammonium phosphate.

(D) Crystallizing from the reaction mixture a solid product consisting essentially of a mixture of ammonium phosphates substantially free of solid ammonium nitrate, and having a $NH_3$ to $H_3PO_4$ mole ratio ranging from 1.1 to 2.0.

(E) Mechanically separating and recovering from the reaction mixture the solid product of step (D) and an aqueous solution filtrate.

Optionally, to obtain a second solid rich in ammonium nitrate from the filtrate of step (E) above, the following steps should be performed in combination:

(F) Decreasing the temperature of the filtrate from step (E) to a value below that used for step (E) but not below normal room temperature, crystallizing from the reaction mixture a solid containing 90–97% ammonium nitrate and 10–3% ammonium phosphate, the ammonium phosphate portions having a $NH_3$ to $H_3PO_4$ mole ratio of 1.1 to 2.0.

(G) Mechanically separating and recovering from the reaction mixture the solid product or step (F) and a liquid filtrate.

The procedures outlined above for the removal of first solid ammonium phosphate and for the optional removal of a second solid rich in ammonium nitrate may be further utilized in a process which includes performing the following steps in combination:

(H) Mixing with the solid and liquid phases of step (A) all or a portion of the filtrate from step (G).

(I) Evaporating water from the mixture of step (H) in an amount equal to that in the nitrate-phosphate feed to the process minus any water from any filtrate from step (G) not fed to step (H) from step (G) and employing the resulting mixture as the contents of the reactor in step (B).

Many variables must be controlled if the invention is to be carried out to best advantage. The critical factors in the operation of the phase reaction in the present process are discussed below along with examples presented for illustrative purposes only.

Example 1 illustrates the invention in one of its simplest embodiments.

Example 1

A mixture of 35.0 g. diammonium phosphate and 86.5 g. ammonium nitrate was slurried with 1.0 g. water at 86° C. for 25 minutes. On filtration 32 g. diammonium phosphate was removed from the process leaving a filtrate containing 3.0 g. diammonium phosphate, 86 g. ammonium nitrate and 11.0 g. water to be adjusted for use as an ammoniating solution.

CONTROL OF WATER CONTENT

The following three examples illustrate the importance of proper water adjustment. Too much water results in less separation of the ammonium phosphate from the ammonium nitrate while too little water results in precipitation of ammonium nitrate along with the ammonium phosphate.

Example 2

A mixture of diammonium phosphate and ammonium nitrate having a diammonium phosphate to ammonium nitrate weight ratio of 1.64 and containing five parts water per 100 parts total mixture was agitated at 90° C. until equilibrium had been reached, about 45 minutes. The slurry which resulted was filtered and the solid removed was analyzed for total nitrogen, ammoniacal nitrogen, and phosphorus. This analysis showed that when corrected for adherent mother liquor the solid was diammonium phosphate and represented 98% of the diammonium phosphate present in the original mixture.

Example 3

Example 2 was repeated, this time with 35 parts water per 100 parts total mixture. The solid, diammonium phosphate, isolated by filtration represented only 49% of the diammonium phosphate present in the original mixture.

Example 4

Example 2 was repeated, this time with 2.5 parts water per 100 parts total mixture. The solid which was isolated by filtration proved, after correction for adherent mother liquor, to be a mixture of 76% diammonium phosphate and 24% ammonium nitrate. The diamonium phosphate removed was 97.5% of that entering the experiment.

CONTROL OF TEMPERATURE

Examples 5 through 7 show that the same type of effect may be obtained by varying temperature as was obtained in Examples 2 through 4 where the amount of water was varied. Within the range of this invention, maximum separation of diammonium phosphate will occur for a given mixture of ammonium phosphate, ammonium nitrate and water, at only one temperature, without contamination with solid ammonium nitrate.

Example 5

A mixture of diammonium phosphate and ammonium nitrate having a ratio of 0.9 part ammonium phosphate per part ammonium nitrate was adjusted until it contained 17 parts water per 100 parts total mixture. This slurry was agitated for 1 hour at 40° C., reaching equilibrium. The resulting slurry was centrifuged, still at 40° C., to remove the solid phase which when corrected for adherent mother liquor was found to consist entirely of diammonium phosphate. The diamonium phosphate isolated represented 95% of that entering the experiment.

Example 6

A mixture of diammonium phosphate and ammonium nitrate in the same ratio as that of Example 5 was also adjusted until it contained 17 parts water per 100 parts total mixture and was agitated for 1 hour at 90° C. On centrifuging at 90° C. the solid, when corrected for adherent mother liquor, was found again to be diammonium phosphate representing, however, only 87% of that present in the original mixture.

Example 7

A third mixture of diammonium phosphate and ammonium nitrate was prepared having the same ratio of diammonium phosphate to ammonium nitrate as Example 5. Again the water was adjusted until it represented 17 parts per 100 parts total mixture. The slurry was agitated at 25° C. for 1 hour and then centrifuged at 25° C. The solid removed, corrected for adherent mother liquor, was found to be 78% diammonium phosphate and 22% ammonium nitrate. The diammonium phosphate removed represented 96.5% of that entering the experiment.

OBTAINING DIAMMONIUM PHOSPHATE AS SOLID PRODUCT

Examples 8 and 9 illustrate how the invention may be used to separate diammonium phosphate from ammonium phosphate—ammonium nitrate mixtures when limited amounts of either monoammonium phosphate or triammonium phosphate are present in the liquid phase.

Example 8

A mixture of 432 grams diammonium phosphate, 33 grams monoammonium phosphate, 478 grams ammonium nitrate and 57 grams water was placed in a closed container and agitated for 1 hour at 90° C. On centrifuging at 90° C. the solid phase was found on analysis and when corrected for adherent mother liquor to be diammonium phosphate and to represent 93% of the diammonium phosphate entering the experiment.

Example 9

A mixture of 378 grams diammonium phosphate, 11 grams triammonium phosphate, 418 grams ammonium nitrate and 193 grams water was mixed at 25° C. until equilibrium had been reached. The slurry was centrifuged at 25° C. yielding a solid. On analysis and after correction for adherent mother liquor, the solid was found to be diammonium phosphate and to be 99.8% of the diammonium phosphate entering the experiment.

CONTROL OF NITRATE ION: WATER RATIO

A relatively simple way has been found to control the variables of this invention when it is desired to obtain maximum separation of diammonium phosphate from a mixture of diammonium phosphate and ammonium nitrate. The weight ratio of nitrate to water in the mixture is merely adjusted to a given value. The value chosen is dependent upon the separation temperature.

Values for the nitrate to water weight ratio to be used are given in Table I for temperatures between 25° and 90° C. Utilizing these values, a wide range of diammonium phosphate-ammonium nitrate mixtures may be separated. Illustrations are shown in Table I for weight ratios of diammonium phosphate to ammonium nitrate which vary from 0.43 to 5.67.

Depending upon the temperature chosen and the diammonium phosphate to ammonium nitrate weight ratio, the amount of solids present in the slurry and the percent diammonium phosphate separated from the incoming mixture will vary. This is also shown in Table I. Using Table I, adjustments may be made in the process depending upon the degree of separation desired or on the slurry handling equipment available.

To illustrate the specific manner in which Table I may be utilized to operate the invention when the separation of diammonium phosphate-ammonium nitrate mixtures are desired, Example 10 is given. This example illustrates No. 11 of Table I.

Example 10

An aqueous mixture of 442 grams diammonium phosphate and 491 grams ammonium nitrate (weight ratio diammonium phosphate to ammonium nitrate=0.9) was adjusted by evaporation so that the nitrate to water weight ratio was 5.7. The resulting slurry was agitated at 90° C. for 1 hour. The solid was then separated in a heated basket type centrifuge also at 90° C. The solid which was removed, when corrected for adherent mother liquor, was found to be diammonium phosphate. The corrected solid weighed 415 grams. The slurry thus had been approximately 41% solids and the diammonium phosphate removed about 94% of that entering the experiment, checking closely No. 11 of Table I.

TABLE I.—DATA FOR THE SEPARATION OF DIAMMONIUM PHOSPHATE FROM DIAMMONIUM PHOSPHATE-AMMONIUM NITRATE MIXTURES
[Solid Phase in each case: $(NH_4)_2HPO_4$]

| Number: | Weight ratio, $NO_3$ to $H_2O$ | Separation temp., ° C. | Weight ratio, $(NH_4)_2HPO_4$ to $NH_4NO_3$ | Percent solids in slurry | Percent of the $(NH_4)_2HPO_4$ in initial mixture isolated as solid phase |
|---|---|---|---|---|---|
| 1 | 1.5 | 25 | 5.67 | 8 | 75 |
| 2 | 1.5 | 25 | 0.90 | 35 | 93 |
| 3 | 1.5 | 25 | 0.43 | 59 | 96 |
| 4 | 2.0 | 40 | 5.67 | 9 | 77 |
| 5 | 2.0 | 40 | 0.90 | 38 | 94 |
| 6 | 2.0 | 40 | 0.43 | 62 | 97 |
| 7 | 3.5 | 70 | 5.67 | 10 | 80 |
| 8 | 3.5 | 70 | 0.90 | 41 | 94 |
| 9 | 3.5 | 70 | 0.43 | 64 | 97 |
| 10 | 5.7 | 90 | 5.67 | 11 | 82 |
| 11 | 5.7 | 90 | 0.90 | 42 | 96 |
| 12 | 5.7 | 90 | 0.43 | 66 | 98 |

GENERAL CONSIDERATIONS

There are no theoretical absolute limits requiring the weight ratio of diammonium phosphate to ammonium nitrates to be held between 0.43 and 5.67 or the temperature to be maintained between 25° and 90° C. The practical reasons for these limitations are based on increased expense and difficulty of carrying out process steps. When the weight ratio of diammonium phosphate to ammonium nitrate is too high, the solid to liquid ratio in the slurry becomes too great for ready phase separation. When the weight ratio of diammonium phosphate to ammonium nitrate becomes too low, the ratio approaches that at which no separation occurs. When the separation temperature is too low, as for example, below 25° C., or sometimes even below 40° C., chilled water must be used, requiring costly refrigeration equipment. Closed equipment is desirable even at temperatures considerably below 90° C. to prevent undue ammonium loss, but when temperatures above about 90° C. are used, the vapor pressure of ammonia is so high that expensive pressure equipment is needed. This is illustrated in Example 11.

The process difficulties recited above will be seen to hold true with other modifications of the invention described later. However, when the ammonium phosphate solid to be isolated is to have N to P atomic ratio less than 2, the separation temperatures may be increased, since the vapor pressure of ammonia will be lower.

Example 11

A mixture of 18 g. diammonium phosphate, 276 g. ammonium nitrate and 15 g. water was placed in a 500 ml. 3-necked, round-bottomed flask. A Teflon-bladed agitator was placed through a water-jacketed bearing in the center opening of the flask, a reflux condenser was positioned on one of the side openings and a glass stopper was inserted in the other side opening. The slurry within the flask was heated with agitation. To test for ammonia during heatings, moist indicator paper was held above a stopcock placed in the top of the reflux condenser. When the temperature reached 85–90° C., a small but definite amount of ammonia evolution was detected. When the temperature exceeded 105° C., ammonia evolution increased until copious amounts were evolved requiring pressure to hold down the glass fittings on the flask.

Utilizing this information, a mixture of 69 g. diammonium phosphate, 76.5 g. ammonium nitrate and 164.5 g. water was evaporated to remove 148.7 g. of water and the ammonia evolved during evaporation was replaced. This slurry was maintained at 105° C. in a closed flask for 1 hour while being agitated. The solid phase was then separated by centrifuging at 105° C. in a closed centrifuge to minimize the loss of ammonia. The solid after correction for adherent mother liquor analyzed as diammonium phosphate and represented 93% of that originally present in the system.

monoammonium phosphate which is a N to P mole ratio of 1.45, close to the values for experiment 16 in Table II.

TABLE II.—EXAMPLES OF EXPERIMENTS IN WHICH SOLID AMMONIUM PHOSPHATE PRODUCTS WERE PRODUCED HAVING N TO P ATOMIC RATIOS BETWEEN 1.1 AND 1.9

| Experiment Number | Temp., °C. | Slurry composition, percent [1] | | | | Mole ratio N to P in solid product | Analysis of solid product, percent [2] | | Amount of compounds entering removed as solid, percent [1] | |
|---|---|---|---|---|---|---|---|---|---|---|
| | | MAP | DAP | AN | $H_2O$ | | N | P | MAP | DAP |
| 12 | 25 | 28.6 | 6.1 | 42.5 | 22.8 | 1.09 | 13.1 | 26.6 | 95 | 53 |
| 13 | 25 | 17.2 | 18.4 | 41.9 | 22.5 | 1.48 | 16.6 | 25.2 | 92 | 85 |
| 14 | 25 | 4.7 | 32.0 | 41.2 | 22.1 | 1.89 | 20.3 | 23.8 | 70 | 91 |
| 15 | 40 | 30.3 | 5.6 | 45.5 | 18.6 | 1.10 | 13.2 | 26.5 | 94 | 65 |
| 16 | 40 | 18.4 | 19.1 | 44.3 | 18.2 | 1.47 | 16.8 | 25.2 | 91 | 90 |
| 17 | 40 | 4.9 | 33.7 | 43.5 | 17.9 | 1.90 | 20.4 | 23.8 | 65 | 94 |
| 18 | 90 | 34.4 | 7.6 | 51.7 | 6.3 | 1.12 | 13.4 | 26.5 | 90 | 61 |
| 19 | 90 | 21.1 | 22.0 | 50.7 | 6.2 | 1.49 | 16.9 | 25.1 | 83 | 87 |
| 20 | 90 | 6.6 | 37.8 | 50.1 | 5.5 | 1.89 | 20.4 | 23.8 | 52 | 93 |

[1] $MAP = NH_4H_2PO_4$, $DAP = (NH_4)_2HPO_4$, $AN = NH_4NO_3$.
[2] Corrected for adherent mother liquor.

OBTAINING SOLID AMMONIUM PHOSPHATE PRODUCTS WITH N:P ATOMIC RATIOS BELOW 2.0

A distinct advantage of this invention is that with proper adjustment of the variables, ammonium phosphate-ammonium nitrate mixtures may be made to yield solid ammonium phosphate having N to P atomic ratios over the entire range from about 1.1 to 2.0. The method for producing solid having a N to P atomic ratio of 2 was disclosed in Examples 1–11 and in Table I. Examples and methods for obtaining products having ratios of N to P between 1.1 and 1.9 are given in Table II which lists the critical values for nine experiments (No. 12–20).

To separate solids having approximately the N to P ratio and analysis indicated in the experiments of Table II, the incoming feed should be adjusted as needed to the "slurry composition" indicated for the specific experiment by ammoniation and either evaporation or dilution. The mixture should then be agitated until equilibrium has been reached, normally 30 min. to 1 hr. and the solid phase separated by any convenient means such as by filtration or centrifugation. The solid should be separated from the liquid phase at the same temperature as that used when equilibrium was reached.

To better show how to utilize the information in Table II, experiment 16 is exemplified in detail below.

Example 12

A mixture of 22 grams ammonium nitrate, 149 grams phosphoric acid and 200 grams water was evaporated with ammoniation until the mixture contained 212 grams ammonium nitrate, 92 grams monoammonium phosphate, 95 grams diammonium phosphate and 92 grams water. The mixture was cooled to 40° C. and the slurry agitated for 45 min. at this temperature after which the solid phase was removed by centrifuging in a centrifuge heated to 40° C. The solid phase after correction for adherent mother liquor weighed 165 grams. Analysis for the solid indicated approximately 50.5% diammonium phosphate and 49.5%

OBTAINING AMMONIUM NITRATE-RICH SOLIDS WITH FILTRATE RECYCLE

Further modifications of this invention enable the user to obtain a second solid product from the filtrate of the ammonium phosphate—ammonium nitrate separation process illustrated in Examples 1–12 and if desired, to recycle the liquid phase. The second solid removed consists of from 90 to 97% ammonium nitrate containing from 10 to 3% ammonium phosphate and is formed by lowering the temperature of the filtrate obtained from the first solid separation. After separation of the ammonium nitrate, the filtrate from this step may be concentrated and prilled, recycled, or used as a liquid fertilizer.

Normally, when the second solid phase is to be isolate, it will be found most economical to remove the first solid, that is, the ammonium phosphate, at a temperature between about 70° or 90° C. and to remove the second solid by lowering the temperature to between 25° and 40° C.

Recycling the filtrate from the ammonium nitrate removal step can be advantageous for any of several reasons. When the feed is a liquid or slurry and must be adjusted in conjunction with the recycle liquor by evaporation of water, the advantages of the cyclic process modification lies in the increased fluidity (reduced solids content) it allows. If some of the recycle liquor is to be purged from the process or is to be removed for other use such as a liquid fertilizer, water evaporation can be adjusted accordingly.

When feed to the process is a solid, operation of the process of the invention with a recycle step permits operation without necessity for both the addition and evaporation of water. That is, it allows the widest choice of operating procedures for most economical operation.

Examples 13–17 illustrate these modifications of the invention.

Example 13

An aqueous mixture containing 24 grams diammonium phosphate and 86 grams ammonium nitrate was adjusted by evaporation until it contained 11 grams water. The slurry was agitated at 86° C. for 30 minutes. On filtration 21 grams diammonium phosphate was removed. The filtrate which consisted of 3 grams diammonium phosphate, 86 grams ammonium nitrate and 11 grams water was cooled with slow agitation to 40° C. over a 30 min. period. The slurry which formed was filtered at 40° C. to remove a mixture of 2.0 grams diammonium phosphate and 56.8 grams ammonium nitrate. The filtrate which contained 1.0 gram diammonium phosphate, 29.2 grams ammonium nitrate and 11.0 grams water was adjusted for use as an ammoniating solution.

Example 14

A mixture of 35.5 grams nitric acid, 33.5 grams phosphoric acid and 50 grams water was evaporated and ammoniated until the mixture contained 45 grams ammonium nitrate, 45 grams diammonium phosphate and 10 grams water. The slurry was agitated at 70° C. for 45 min. and filtered at this temperature. The solid removed consisted of 43.3 grams diammonium phosphate. The filtrate was cooled with slow agitation to 40° C. After 10 min. at 40° C., the slurry was filtered at temperature. The solid removed weighed 19.3 grams after correction for adherent mother liquor. On analysis, it was found to consist of 4.2% diammonium phosphate and 95.8% ammonium nitrate. The liquid phase from the filtration at 40° C. contained 2.5% diammonium phosphate, 70.8% ammonium nitrate and 26.7% water. This liquid was adjusted for use as an ammoniating solution.

Example 15

Recycle liquor containing 388 grams ammonium nitrate, 11 grams diammonium phosphate, 3.3 gms. ammonium chromate, as tracer, and 150 grams water was placed in a 3-necked, round-bottomed flask of 1-liter capacity. The flask was placed in a magnetically stirred (Magni Whirl) constant temperature bath with flask contents at 70° C. Feed mixture containing 262 grams ammonium nitrate mixed with 189 grams diammonium phosphate was added to the 1-liter flask while the contents of the flask was being agitated. The feed addition time was approximately 30 minutes. The slurry was then agitated for one hour. Analysis of the filtrate showed 2.8% diammonium phosphate and 79.9% ammonium nitrate. The slurry in the 1-liter flask was centrifuged in a basket centrifuge. The solid weighed 178.4 grams. Analysis of the damp solid showed 96.1% diammonium phosphate and 2.3% ammonium nitrate. Correction for adherent mother liquor and conversion to an anhydrous basis gave an analysis corresponding to 100% diammonium phosphate.

Filtrate from the solid-liquid separation was placed in a 3-necked, round-bottomed flask of 1-liter capacity and cooled in a Magni Whirl constant temperature bath to 40° C. during a one hour period. After agitation for an additional 15 minutes, the slurry was centrifuged as in the previous step. A solid weighing 232.7 grams was obtained. Analysis indicated 97% ammonium nitrate and 3% diammonium phosphate. Corrected for adherent mother liquor and converted to an anhydrous basis, the analysis was 96.8% ammonium nitrate and 3.2% diammonium phosphate. The filtrate from the final centrifuging weighed 487.4 gms. and analyzed 2.4% $(NH_4)_2HPO_4$ and 69.1% $NH_4NO_3$. The difference between initial and final recycle liquor weights could be accounted for by samples taken for analysis and handling losses. Balances for the experiment were: nitrogen= 98.5%, phosphorus=97.2%, chromium=95.1%.

The percentage of chromium recovered gives an indication of the efficiency with which steps were carried out, particularly the separation of solids from liquids. It will be appreciated that in fertilizer manufacture, 100 percent efficiency in separation steps would be prohibitively expensive and wet solids must, of necessity, contain considerable adherent mother liquor.

Example 16

Recycle liquor from the process containing 3.6 grams monoammonium phosphate, 5.4 grams diammonium phosphate, 109.8 grams ammonium nitrate, 1.05 grams ammonium chromate (as a tracer) and 43.2 grams water was placed in a three-necked, round-bottomed flask of 1 liter capacity. The recycle mixture was agitated at 70° C. while a mixture containing 85.0 grams monoammonium phosphate, 85.0 grams diammonium phosphate and 250.2 grams ammonium nitrate was added to the flask over a 15 min. period. Agitation was continued for 1 hour and after removing a 10 ml. sample for analysis, the slurry was centrifuged. The centrifugate was placed in a three-necked, round-bottomed flask of 1 liter capacity and agitated for 1 hour as it was cooled to 40° C. Agitation was continued at 40° C. for an additional 30 minutes. After taking a 10 ml. sample of filtrate for analysis, the slurry was centrifuged as before. The filtrate from the second solids removal step was returned to the process for use as recycle liquor.

Analysis of the solid removed at 70° C. showed 46.5% monoammonium phosphate, 49.5% diammonium phosphate and 4.0% ammonium nitrate. Corrected for adherent mother liquor, the analysis was 47.1% monoammonium phosphate, 50.2% diammonium phosphate and 2.7% ammonium nitrate. The solid obtained at 40° C. contained, when corrected for adherent mother liquor 9.8% monoammonium phosphate, 2.2% diammonium phosphate and 88% ammonium nitrate.

EFFECT OF IMPURITIES

Often the phosphate-nitrate mixtures to be separated will contain impurities. For example, solutions from nitrophosphate processes often consist or can be modified to consist at one stage in the process of mixtures equivalent to ammonium nitrate and phosphoric acid. These mixtures contain calcium as one of the impurities. In the final product, calcium may be present in a mole ratio with the phosphorus of about 0.1. When such a mixture is to be separated and is adjusted by the method described in this invention, any calcium precipitates as calcium phosphate, usually dicalcium phosphate, and is almost completely removed with the ammonium phosphate solid phase. The phosphorus values associated with the calcium are citrate-soluble and are therefore available to plants. Example 17 illustrates this invention when the feed used was obtained from a sulfate cycle nitrophosphate process.

EXAMPLE 17

Recycle liquor containing 280 grams ammonium nitrate, 8 grams diammonium phosphate, 4.0 grams sodium chloride, as a tracer, and 108 grams water was placed in a 3-necked, round-bottomed flask of 1-liter capacity. The flask was placed in a Magni Whirl constant temperature bath at 72° C. A Teflon-bladed agitator was placed in the center neck of the flask and the recycle liquor agitated for 30 minutes until its temperature reached 70° C. The solid feed weighing 461.6 grams was then added to the recycle liquor in the 1-liter flask over a 30-minute period. Feed analysis: ammoniacal nitrogen=16.8%, nitrate nitrogen=8.2%, water soluble $P_2O_5$=20.5, total $P_2O_5$=22.3%, CaO=1.3% and $H_2O$=2.2%.

After an additional 30 minutes agitation time, a filtrate sample was obtained. It analyzed 74.4% ammonium nitrate and 4.5% diammonium phosphate. The slurry was then centrifuged at 70° C. in a basket centrifuge. Weight of the damp solid was 251.1 grams. Direct analysis of the damp solid showed 25.6% ammonium nitrate, 57.3% diammonium phosphate and 4.4% dicalcium phosphate dihydrate. Correction for adherent mother liquor using the tracer and conversion to an anhydrous basis showed that the precipitate consisted of 92.6% diammonium phosphate and 7.4% dicalcium phosphate dihydrate, an impurity in the feed.

The filtrate from the phase separation was placed in a 1-liter, round-bottomed flask and the flask placed in a Magni Whirl constant temperature bath at 70° C. The temperature of the bath was decreased to 40° C. over an 80-minute period. After an additional 10 minutes, the slurry was centrifuged in a basket centrifuge. Weight of solid obtained was 119.7 grams which, when analyzed "as is," showed the presence of 93.4% ammonium nitrate, 4.6% diammonium phosphate and 0.3% dicalcium phosphate dihydrate. Corrected for adherent mother liquor using the chloride tracer and converted to an anhydrous basis, the solid analyzed 95.1% ammonium nitrate, 4.6% diammonium phosphate and 0.3% dicalcium phosphate. The liquid from the phase separation weighed 389 grams and analyzed 67.5% ammonium nitrate and 4.6% diammonium phosphate.

I claim:

1. A process for manufacturing solid crystalline ammonium phosphate of varying composition substantially free from ammonium nitrate consisting of performing the following steps in combination, (A) feeding to a reactor and reacting together a mixture of solid and aqueous liquid phases of a composition consisting essentially of ammonium nitrate, ammonium phosphate and water, while maintaining a temperature ranging from normal room temperature to the boiling point at atmospheric pressure, (B) controlling the proportions of water and nitrate ion in the liquid phase in the reactor within the following concentration limits:
   (1) water content of the liquid phase between 5 weight percent at the highest operating temperature and 35 weight percent at the lowest operating temperature,
   (2) nitrate ion to water weight ratio in the liquid phase between 7.0 at the highest operating temperature and 1.3 at the lowest operating temperature, (C) controlling the proportions of ammonium and phosphate ions in the liquid phase within the reactor so that in addition to the ammonium nitrate present there are also sufficient additional ammonium ions to maintain the concentration of ammonium phosphate within one of the following three sets of limitations:
   (1) from less than 6 weight percent monoammonium phosphate at the highest operating temperature to less than 2.5 weight percent at the lowest operating temperature in combination with from 2 to 5 weight percent diammonium phosphate,
   (2) from 2 to 5 weight percent diammonium phosphate,
   (3) less than 2.0 weight percent triammonium phosphate in combination with from 0.2 to 1.0 weight percent diammonium phosphate, (D) crystallizing from the reaction mixture a solid product consisting essentially of a mixture of ammonium phosphates substantially free of solid ammonium nitrate, and having a $NH_3$ to $H_3PO_4$ mole ratio ranging from 1.1 to 2.0, and (E) mechanically separating and recovering from the reaction mixture the solid product of step (D).

2. A process for manufacturing solid crystalline ammonium phosphate of varying composition substantially free from ammonium nitrate consisting of performing the following steps in combination, (A) feeding to a reactor and reacting together a mixture of solid and aqueous liquid phases of a composition consisting essentially of ammonium nitrate, ammonium phosphate and water, while maintaining a temperature ranging from normal room temperature to the boiling point at atmospheric pressure, (B) controlling the proportions of water and nitrate ion in the liquid phase in the reactor within the following concentration limits:
   (1) water content of the liquid phase between 5 weight percent at the highest operating temperature and 35 weight percent at the lowest operating temperature,
   (2) nitrate ion to water weight ratio in the liquid phase between 7.0 at the highest operating temperature and 1.3 at the lowest operating temperature, (C) controlling the proportions of ammonium and phosphate ions in the liquid phase within the reactor so that in addition to the ammonium nitrate present there are also sufficient additional ammonium ions to maintain the concentration of ammonium phosphate within one of the following three sets of limitations:
   (1) from less than 6 weight percent monoammonium phosphate at the highest operating temperature to less than 2.5 weight percent at the lowest operating temperature in combination with from 2 to 5 weight percent diammonium phosphate,
   (2) from 2 to 5 weight percent diammonium phosphate,
   (3) less than 2.0 weight percent triammonium phosphate in combination with from 0.2 to 1.0 weight percent diammonium phosphate, (D) crystallizing from the reaction mixture a solid product consisting essentially of a mixture of ammonium phosphates having a $NH_3$ to $H_3PO_4$ mole ratio ranging from 1.1 to 2.0 and substantially free of solid ammonium nitrate, and (E) mechanically separating and recovering from the reaction mixture the solid product of step (D) and an aqueous solution filtrate, (F) decreasing the temperature of the filtrate from step (E) to a value below that used for step (E) but not below normal room temperature, crystallizing from the reaction mixture a solid containing 90–97% ammonium nitrate and 10–3% ammonium phosphate, the ammonium phosphate portions having a $NH_3:H_3PO_4$ mole ratio of 1.1 to 2.0.

(G) mechanically separating and recovering from the reaction mixture the solid product of step (F).

3. A process for manufacturing solid crystalline ammonium phosphate of varying composition substantially free from ammonium nitrate consisting of performing the following steps in combination, (A) feeding to a reactor and reacting together a mixture of solid and aqueous liquid phases of a composition consisting essentially of ammonium nitrate, ammonium phosphate and water, while maintaining a temperature ranging from normal room temperature to the boiling point at atmospheric pressure, (B) controlling the proportions of water and nitrate ion in the liquid phase in the reactor within the following concentration limits:
   (1) water content of the liquid phase between 5 weight percent at the highest operating temperature and 35 weight percent at the lowest operating temperature,
   (2) nitrate ion to water ratio in the liquid phase between 7.0 at the highest operating temperature and 1.3 at the lowest operating temperature, (C) controlling the proportions of ammonium and phosphate ions in the liquid phase within the reactor so that in addition to the ammonium nitrate present there are also sufficient additional ammonium ions to maintain the concentration of ammonium phosphate within one of the following three sets of limitations:
   (1) from less than 6 weight percent monoammonium phosphate at the highest operating temperature to less than 2.5 weight percent at the lowest operating temperature in combination with from 2 to 5 weight percent diammonium phosphate,
   (2) from 2 to 5 weight percent diammonium phosphate,
   (3) less than 2.0 weight percent triammonium phosphate in combination with from 0.2 to 1.0 weight percent diammonium phosphate, (D) crystallizing from the reaction mixture a solid product consisting essentially of a mixture of ammonium phosphates having a $NH_3$ to $H_3PO_4$ mole ratio ranging from 1.1 to 2.0 and substantially free of solid ammonium nitrate, and (E) mechanically separating and recovering from the reaction mixture the solid product of step (D) and an aqueous solution filtrate, (F) decreasing the temperature of the filtrate from step (E) to a value below that used for step (E) but not below normal room temperature, crystallizing from the reaction mixture a solid containing 90–97% ammonium nitrate and 10–3% ammonium phosphate, the ammonium phosphate portions having a $NH_3:H_3PO_4$ mole ratio of 1.1 to 2.0.

(G) mechanically separating and recovering from the reaction mixture the solid product of step (F) and a liquid filtrate, (H) forming a mixture of the solid and liquid phases of step (A) with at least a portion of the liquid filtrate from step (G), (I) evaporating water from the mixture of step (H) in an amount equal to that in the nitrate-phosphate feed to the process minus any water from any filtrate from step (G) not fed to step (H) from step (G) and employing the resulting mixture as the contents of the reactor in step (B).

4. A process for manufacturing solid crystalline diammonium phosphate substantially free from ammonium nitrate consisting of performing the following steps in combination, (A) feeding to a reactor and reacting together a mixture of solid and aqueous liquid phases of a composition consisting essentially of ammonium nitrate, ammonium phosphate and water, while maintaining a temperature within the range of 40° to 90° C., (B) controlling the proportions of water and nitrate ion in the liquid phase in the reactor within the following concentration limits:

(1) water content of the liquid phase about 11 to 28 weight percent, (2) nitrate ion to water weight ratio in the liquid phase about 2 to 6, (C) controlling the proportions of ammonium and phosphate ions in the liquid phase within the reactor so that in addition to the ammonium nitrate present there are sufficient additional ammonium ions to maintain the concentration of ammonium phosphate at substantially zero weight percent monoammonium phosphate in combination with about 2 to 3 weight percent diammonium phosphate, and (D) crystallizing from the reaction mixture a solid product consisting essentially of diammonium phosphate substantially free of solid ammonium nitrate, and (E) mechanically separating and recovering from the reaction mixture the solid product of step (D).

References Cited

UNITED STATES PATENTS

| | | | |
|---|---|---|---|
| 2,036,244 | 4/1936 | Wadsted et al. | 71—35 |
| 2,689,175 | 9/1954 | Strelzoff et al. | 71—39 |

REUBEN FRIEDMAN, Primary Examiner

C. N. HART, Assistant Examiner

U.S. Cl. X.R.

71—59

PO-1050
(5/69)

UNITED STATES PATENT OFFICE
CERTIFICATE OF CORRECTION

Patent No. 3,573,029                    Dated March 30, 1971

Inventor(s) William T. Curless

It is certified that error appears in the above-identified patent and that said Letters Patent are hereby corrected as shown below:

Column 3, line 48, the word "or" should read -- of -- to be correct. Column 3, line 73, the number "1.0" should read -- 11.0 -- to be correct. Column 7, line 74, the word "for" should read -- of -- to be correct. Column 12 line 50 after the word "water" should insert the word -- weight -- to be correct.

Signed and sealed this 17th day of August 1971.

(SEAL)
Attest:

EDWARD M. FLETCHER, JR.
Attesting Officer

WILLIAM E. SCHUYLER, JR
Commissioner of Patent